(12) United States Patent
Condosta et al.

(10) Patent No.: US 11,203,791 B2
(45) Date of Patent: Dec. 21, 2021

(54) METHOD AND APPARATUS FOR PRODUCING DIRECT REDUCED IRON UTILIZING A CATALYTICAL PRETREATMENT OF HYDROCARBONS AS A SOURCE OF REDUCING GAS

(71) Applicants: DANIELI & C. OFFICINE MECCANICHE SPA, Buttrio (IT); HYL TECHNOLOGIES, S.A. DE C.V., San Nicolas de los Garza (MX)

(72) Inventors: Michele Condosta, Vigodarzere (IT); Daniela Dalle Nogare, Povoletto (IT); Alessandra Primavera, Faedis (IT); Alessandro Martinis, Pozzuolodel del Friuli (IT); Eugenio Zendejas Martinez, Monterrey-Nuevo Leon (MX)

(73) Assignees: DANIELI & C. OFFICINE MECCANICHE S.P.A, Buttrio (IT); HYL TECHNOLOGIES S.A. DE C.V., San Nicolas de los Garza (MX)

( * ) Notice: Subject to any disclaimer, the term of this patent is extended or adjusted under 35 U.S.C. 154(b) by 433 days.

(21) Appl. No.: 16/322,689

(22) PCT Filed: Aug. 2, 2017

(86) PCT No.: PCT/EP2017/069517
§ 371 (c)(1),
(2) Date: Feb. 1, 2019

(87) PCT Pub. No.: WO2018/024767
PCT Pub. Date: Feb. 8, 2018

(65) Prior Publication Data
US 2021/0032712 A1     Feb. 4, 2021

(30) Foreign Application Priority Data
Aug. 3, 2016 (IT) .................. 102016000081851

(51) Int. Cl.
C21B 13/14      (2006.01)
C21B 13/00      (2006.01)
C21B 13/02      (2006.01)

(52) U.S. Cl.
CPC .......... C21B 13/0073 (2013.01); C21B 13/14 (2013.01); C21B 13/02 (2013.01);
(Continued)

(58) Field of Classification Search
CPC . C21B 13/0073; C21B 13/14; C21B 2100/42; C21B 2400/068; C21B 13/02
See application file for complete search history.

(56) References Cited

U.S. PATENT DOCUMENTS 4,046,557 A * 9/1977 Beggs .................. C21B 13/029
                                                    75/490
4,054,444 A * 10/1977 Clark .................. C21B 13/0086
                                                    75/496
(Continued)

FOREIGN PATENT DOCUMENTS

WO      2011/012964 A2    2/2011

OTHER PUBLICATIONS

Int'l Search Report and Written Opinion dated Sep. 26, 2017 in Int'l Application No. PCT/EP2017/069517.
(Continued)

*Primary Examiner* — Scott R Kastler
(74) *Attorney, Agent, or Firm* — Panitch Schwarze Belisario & Nadel LLP (57) ABSTRACT

A method and apparatus for producing direct reduced iron using a pre-treated make-up gas as a reducing agent in a direct reduced iron reactor are provided. The method involves pre-treating a stream of make-up gas containing heavy hydrocarbons by subjecting the stream to low temperature adiabatic reforming at a temperature between 300°
(Continued)

C. and 600° C., prior to using the stream of make-up gas as a reducing agent for producing direct reduced iron. The method also involves adjusting the humidity content of the stream of make-up gas after the low temperature adiabatic reforming by bypassing the stream to selectively split it into a first part of the stream of make-up gas and a second part of the stream of make-up gas, subjecting the first part to water separation, and then mixing the first part with the second part to obtain a reducing stream to be sent to direct reduced iron production.

19 Claims, 4 Drawing Sheets

(52) U.S. Cl.
CPC .... *C21B 2100/282* (2017.05); *C21B 2100/42* (2017.05); *C21B 2400/068* (2018.08)

(56) References Cited

U.S. PATENT DOCUMENTS

| | | | |
|---|---|---|---|
| 4,756,750 A | | 7/1988 | Bixler et al. |
| 5,110,350 A | * | 5/1992 | Villarreal-Trevino ........................ C21B 13/029 75/495 |
| 6,039,916 A | | 3/2000 | Celada-Gonzalez et al. |
| 2012/0125157 A1 | * | 5/2012 | Duarte-Escareno ........................ B01D 53/1475 75/392 |
| 2013/0090505 A1 | | 4/2013 | Catchpole |
| 2021/0032712 A1 | * | 2/2021 | Condosta ............ C21B 13/0073 |

OTHER PUBLICATIONS

Int'l Preliminary Report on Patentability dated Jun. 27, 2018 in Int'l Application No. PCT/EP2017/069517.

\* cited by examiner fig. 3 fig. 5

METHOD AND APPARATUS FOR PRODUCING DIRECT REDUCED IRON UTILIZING A CATALYTICAL PRETREATMENT OF HYDROCARBONS AS A SOURCE OF REDUCING GAS

CROSS-REFERENCE TO RELATED APPLICATION

This application is a Section 371 of International Application No. PCT/EP2017/069517, filed Aug. 2, 2017, which was published in the English language on Feb. 8, 2018, under International Publication No. WO 2018/024767 A1, which claims priority under 35 U.S.C. § 119(b) to Italian Application No. 102016000081851, filed Aug. 3, 2016, the disclosures of which are incorporated herein by reference in their entirety.

FIELD OF THE INVENTION

Embodiments of the present invention relate to a method and an apparatus for pre-treating a make-up gas containing heavy hydrocarbons prior to using it as reducing agent for producing Direct Reduced Iron (DRI).

Further embodiments of the present invention relate to a method and apparatus for producing direct reduced iron using a stream of make-up gas.

BACKGROUND OF THE INVENTION

In the recent years, one of the successful routes for steelmaking, which is being increasingly promoted due to its low environmental impact and high energy efficiency, is the gas based Direct Reduction of Iron Ore to produce Direct Reduced Iron (DRI) by circulating a reducing gas through a moving bed of particulate iron ore at a temperature of the order of 700° C. to 1100° C. Oxygen is removed from the iron ore by chemical reduction for the production of highly metallized DRI.

Some further advantages of the gas based direct reduction plants are the wide range of production capacity, the production of metallic iron in solid form with low sulphur and silicon content, and the possibility to use the resulting DRI as raw material for the electric furnace in such a way that it may constitute whole charge of the electric furnace for the production of high quality steel. Moreover DRI can be used as feed material in Blast Furnaces or in the Basic Oxygen Furnaces.

The reducing agents utilized in the direct reduction plants are hydrogen and carbon monoxide, obtained by reformation of natural gas (NG) in an external in-line or off-line catalytic reformer or "in situ" within the iron reduction system (zero-reforming process scheme). Nevertheless, a direct reduction plant can be also designed for utilizing other sources of energy available in the form of gases from coke ovens, blast furnaces, coal or oil gasification, exhaust gases containing hydrogen and carbon monoxide arriving from other chemical/metallurgical processes, etc.

Natural gas is the main reducing gas source in the direct reduction process. According to documents U.S. Pat. Nos. 4,668,284, 5,858,057 and 6,039,916, natural gas can be fed directly to the reduction circuit, where it mixes with the recycled gas coming from the CO2 removal unit. The so obtained process gas passes through a humidifier, it may undergo some pre-preheating and it is sent to the process gas heater, from which it exits at a temperature between 850° C. and 1000° C. There might be a further heating by means of the injection of an oxygen rich gas, to reach a temperature between 950° C. and 1150° C. Fed to the reactor, the process gas having a methane content varying between 10% and 30% and steam content in the range 4-12%, before oxygen injection, releases the reducing gas for the direct reduction reactions coming in contact with the DRI present at the injection point. The exhaust gas exiting the shaft reactor is dedusted, dewatered, compressed and sent to the CO2 removal unit.

The reducing gas to be heated up in the process gas heater is a mixture of $H_2$, CO and natural gas, and it has a controlled amount of humidity, which is needed to control the amount of carbon content of the produced DRI and at the same time limits the cracking of higher hydrocarbons inside the process-gas-heater (PGH) tubes.

Similar composition is present in reducing gas circuits where an in-line stoichiometric reformer is present and fed with gas containing $H_2$, CO and natural gas.

The humidity is also in this case a controlling parameter to allow hydrocarbons reforming and to prevent catalyst carburization. Nevertheless, when the content of hydrocarbons heavier than ethane (C2+) and especially heavier than propane (C3+) is not negligible, the amount of steam and $CO_2$ present in the feeding is not sufficient to avoid deposits of solid carbon on the catalyst, requiring catalyst cleaning (steaming) by time to time.

Anyhow, a certain amount of humidity is required in the inlet zone of the shaft reactor to push the selectivity of methane conversion towards the steam reforming reaction instead of the cracking reaction, with a ratio between the two reactions that can be controlled and may vary between 1 and 2, respectively. However, $H_2O$ is also a product of the reduction reactions, and its presence inside the process gas inhibits somehow the reduction reactions, therefore steam must be added thriftily.

There are several areas in the world were the available natural gas contains non-negligible amount of heavy hydrocarbons such as ethane, propane, butane and higher hydrocarbons. When the amount of heavy hydrocarbons is so high that the steam required to protect the process gas heater tubes would interfere with the direct reduction process itself, some strategies must be applied to reduce at least the C3+ concentrations. Within C3+ it is meant to include aliphatic or aromatic compounds with a molecular weight equal or higher than molecular weight of propane.

The commonly adopted processes for separating higher hydrocarbons from natural gas are expansion (U.S. Pat. No. 4,932,213), cooling (EP-A-0.769.668), absorption in a solvent (U.S. Pat. No. 4,822,948), membranes (US-A-2014/0243572) and adsorption on a substrate, both with PSA (pressure swing adsorption, U.S. Pat. No. 6,444,012) or TSA (temperature swing adsorption, U.S. Pat. No. 3,161,489).

As a general rule, expansion and/or cooling are the most expensive, mainly from capital costs point of view.

On the other hand, membranes absorption or adsorption are not selective in C2+ removal, leading to a secondary stream of gas, which needs to be managed inside the plant as fuel or for other uses.

The aforementioned physical separations have the further drawback of increasing the relative concentration of inert gases in the treated natural gas with respect to the raw natural gas.

A valuable alternative is a chemical transformation of the higher hydrocarbon charge into syngas (a mixture of carbon monoxide and hydrogen produced industrially and normally used as a feedstock in making synthetic chemicals) and methane, through a catalytic process in presence of steam, like in the low temperature adiabatic reforming, also called pre-reforming. The products exiting the low temperature adiabatic reformer are named pre-reformed gas.

Pre-reforming of hydrocarbon feedstocks has been in use for decades to reduce the tendency to form carbon inside the primary reformer tubes, with the further benefit to increase the overall capacity in terms of reformed gas, like in U.S. Pat. No. 8,591,769, where it is also disclosed that the utilization of waste heat from some process stream at 450° C. until 800° C. is much more efficient in the pre-reformer than in the production of steam having low boiling point. The advantage of pre-reforming is that by converting heavier hydrocarbons it simplifies reaction chemistry and diminishes the carburizing potential of the gas. The main part of the pre-reforming unit is constituted by a low temperature adiabatic bed of very active reforming catalyst. Nowadays, pre-reforming has proved itself to be a cost-effective and efficient step in the production of syngas (e.g. Ammonia, Methanol, Hydrogen plants) both in new plants and in the retrofitting of older units. Besides its application in the steam reformer fields, it can be beneficial for the pre-treatment of NG with the only purpose of removing the heavier hydrocarbons, like in US-A-2013/090505, where the pre-reformer gas is then cooled down to be sent to a Gas To Liquid process.

A further approach is known from document U.S. Pat. No. 4,631,182, which discloses a method for producing a reducing gas with a two steps catalytic process including subjecting the make-up gas to an adiabatic reformation and a primary reformation, prior to producing direct reduced iron in a reduction reactor. This known method starts from a desulphurized hydrocarbon feedstock composed by methane and higher hydrocarbons. In particular, the two steps of adiabatic reformation and primary reformation produce a syngas, composed by hydrogen and carbon monoxide, which is the reducing agent used then for the direct reduction process in the reduction reactor. Gas retrieved from the reduction reactor is recirculated back to the process, where it mixes with the make-up gas exiting the adiabatic reformer (first step) and the mixture so obtained is then fed to the primary reformer (second step). There is therefore a need to improve a method and an apparatus for producing direct reduced iron using a pre-treated make-up gas containing heavy hydrocarbons, which overcome at least one of the drawbacks in the art.

There is also a need to improve a method and an apparatus method for humidity content adjustment of a make-up gas to be used as a reducing agent for producing direct reduced iron.

Various limitations and disadvantages of conventional solutions and technologies will become apparent to one of skill in the art after reviewing the remainder of the present application with reference to the drawings and description of the embodiments which follow, though it should be understood that this description of the related art section is not intended to serve as an admission that the described subject matter is prior art.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

According to embodiments, a method for producing direct reduced iron is provided. In one embodiment, the method comprises producing direct reduced iron using said pre-treated make-up gas as a reducing agent in a direct reduced iron reactor, and wherein producing direct reduced iron is carried-out using a zero-reformer process in which catalytic reformation of the pre-treated make-up gas is carried-out "in situ" within the direct reduced iron reactor such that the pre-treated make-up gas is subjected to no further catalytic reaction besides the catalytic reactions that occur inside said direct reduced iron reactor.

The method also provides to:

pre-treating a stream of make-up gas containing heavy hydrocarbons by subjecting the stream of make-up gas to a low temperature adiabatic reforming at a temperature comprised between 300° C. and 600° C., prior to using said stream of make-up gas as a reducing agent for producing direct reduced iron;

subjecting the pre-treated stream of make-up gas to adjusting humidity content of the stream of make-up gas after the low temperature adiabatic reforming by bypassing the stream of make-up gas to selectively split the stream into a first part and a second part of said stream of make-up gas and subjecting the first part to a water separation and then mixing it to the second part to obtain a reducing stream to be sent to direct reduced iron production.

According to further embodiments, an apparatus for producing direct reduced iron is provided. In one embodiment, the apparatus comprises:

a direct reduced iron equipment comprising a direct reduced iron reactor; wherein said direct reduced iron equipment is configured for carrying-out a zero-reformer process in which catalytic reformation of the pre-treated make-up gas is carried-out "in situ" within the direct reduced iron reactor such that the pre-treated make-up gas is subjected to no further catalytic reaction besides the catalytic reactions that occur inside said direct reduced iron reactor.

The apparatus also comprises a low temperature adiabatic reforming section comprising a low temperature adiabatic reforming reactor configured for subjecting a stream of make-up gas containing heavy hydrocarbons to a low temperature adiabatic reforming at a temperature comprised between 300° C. and 600° C., prior to using said stream of make-up gas as a reducing agent for producing direct reduced iron in said direct reduced iron equipment, in order to obtain a pre-reformed gas suitable for use as a reducing agent for producing direct reduced iron in said direct reduced iron equipment.

The apparatus also comprises a humidity adjustment unit configured for adjusting humidity content of the stream of make-up gas after the low temperature adiabatic reformer, said humidity adjustment unit comprising:

a bypass provided with a first branch and a second branch to selectively split the stream of make-up gas into a first part of the stream of make-up gas and a second part of the stream of make-up gas;

a water separation unit associated to the first branch and configured for subjecting the first part to a water separation to be then mixed with the second part to obtain a reducing stream to be sent to the direct reduced iron equipment.

According to still further embodiments, a method for humidity content adjustment of a make-up gas to be used as a reducing agent for producing direct reduced iron is provided. In one embodiment, the method comprises:

subjecting a make-up gas to a pre-treatment or a catalytic conversion/transformation process, in the presence of steam/water, prior to using it as a reducing agent for producing direct reduced iron;

subjecting, downstream of the pre-treatment or catalytic conversion/transformation process in the presence of steam/water and upstream of the production of direct reduced iron, the make-up gas to humidity content adjustment by by-passing said stream of make-up gas to selectively split said stream into a first part of said stream of make-up gas and a second part of said stream of make-up gas and subjecting said first part to a water separation and then mixing said first part to said second part to obtain a reducing stream to be sent to direct reduced iron production.

According to yet further embodiments, an apparatus for humidity content adjustment of a make-up gas to be used as a reducing agent for producing direct reduced iron is provided. In one embodiment, the apparatus comprises:

a make-up gas pre-treating and/or catalytic conversion/transformation section in the presence of steam and/or water;

a humidity adjustment unit configured for adjusting humidity content of said make-up gas after the pre-treating and/or catalytic conversion/transformation section, said humidity adjustment unit comprising:

a bypass to selectively split said stream of make-up gas into a first part of said stream of make-up gas and a second part of said stream of make-up gas;

a water separation unit configured for subjecting said first part to a water separation to be then mixed with said first part to obtain a reducing stream to be sent to a direct reduced iron equipment.

These and other features, aspects and advantages of the present disclosure will become better understood with reference to the following description, the drawings and appended claims. The drawings, which are incorporated in and constitute a part of this specification, illustrate embodiments of the present subject matter and, together with the description, serve to explain the principles of the disclosure.

The various aspects and features described in the present disclosure can be applied, individually, wherever possible. These individual aspects, for instance the aspects and features described in the attached dependent claims, can be made subject of divisional patent applications.

It is noted that anything found to be already known during the patenting process is understood not to be claimed and to be the subject of a disclaimer.

DETAILED DESCRIPTION OF SOME FORMS OF EMBODIMENTS

Reference will now be made in detail to the various embodiments of the invention, one or more examples of which are illustrated in the figures. Within the following description of the drawings, the same reference numbers refer to the same components. Generally, only the differences with respect to individual embodiments are described. Each example is provided by way of explanation of the invention and is not meant as a limitation of the invention. For example, features illustrated or described as part of one embodiment can be used on or in conjunction with other embodiments to yield yet a further embodiment. It is intended that the present invention includes such modifications and variations.

Before describing these embodiments, it shall be also clarified that the present description is not limited in its application to details of the construction and disposition of the components as described in the following description using the attached drawings. The present description can provide other embodiments and can be obtained or executed in various other ways. It shall also be clarified that the phraseology and terminology used here is for the purposes of description only, and cannot be considered as limitative.

It shall further be clarified that all the measurements are referred, unless otherwise indicated, at 0° C. and atmospheric pressure. All the temperatures, unless otherwise indicated, are expressed in degrees Celsius.

All the ranges reported here shall be understood to include the extremes, including those that report a range "between" two values. Furthermore, all the ranges reported here shall be understood to include and describe the punctual values included therein, and also all the sub-intervals.

Embodiments of the present disclosure generically relates to producing Direct Reduced Iron (DRI) using a stream of make-up gas containing heavy hydrocarbons to be fed directly to the reduction circuit, without treating it in an off-line external steam reformer and without some physical separation, like expansion, membranes, absorption, adsorption and so on. The amount of heavy hydrocarbons can advantageously be controlled in order to limit the risk of carbon deposition either in the radiant tubes of the process gas heater in a zero-reformer process scheme or, as an alternative, in the inlet zone of a catalytic tube of an in-line stoichiometric reformer.

Embodiments of the present disclosure can be generically based on the treatment of the make-up gas, prior to using it as a reducing agent for producing direct reduced iron, through a low temperature catalytic converter, e.g. a low temperature adiabatic reformer, also called pre-reformer, operated at the optimum steam to carbon ratio requirement, depending on the catalyst type, in order to minimize the steam production and also to fulfill the water requirement of the reducing gas fed to the direct reducing plant reactor.

Overall, the reactions taking place in the pre-reformer are nearly isothermal or slightly endothermic and the reactor does not require heat supply through burners like in the conventional steam reformers at high temperature. Another peculiarity of a pre-reformer is that at the operating temperature, i.e. approximately 500° C., the methanation reaction is faster than the methane reforming reaction. The net result is that the syngas generated from the reforming of the heavy hydrocarbons is partly converted into methane, which content increases from the inlet to the outlet of the pre-reformer. The outlet stream, free or essentially free of heavy hydrocarbons, can be injected directly into the reducing gas circuit, with or without an adjustment of the steam content, according to the steam requirement of the direct reduction process. A significant improvement of the direct reduction process is that the process gas humidifier can be possibly avoided.

A possible indirect benefit obtained after the insertion of a low temperature adiabatic reformer in a zero-reformer direct reduction process is that some syngas can be injected in the reducing gas circuit, making the start-up of the plant faster with respect to the conventional zero-reforming plant, where hydrogen generation takes place only inside the reduction circuit.

Alternatively, the insertion of pre-reformed gas during the start-up phase of an in-line stoichiometric reformer can help to accelerate the recovery of the catalytic activity. Embodiments described herein thus relate to a method and an apparatus for pre-treating a stream of make-up gas containing heavy hydrocarbons prior to using it as a reducing agent for producing direct reduced iron.

Further embodiments described herein relate to a method and an apparatus for producing direct reduced iron in a direct reduced iron equipment, using the above mentioned pre-treated stream of make-up gas.

It is noted here that a make-up gas containing heavy hydrocarbons within the embodiments described herein can be a natural gas or other gases, containing a not negligible amount of hydrocarbons rather than methane.

It is further noted here that heavy hydrocarbons as used within the embodiments described herein can be hydrocarbons C2+, meaning to include aliphatic or aromatic compounds with a molecular weight equal or higher than molecular weight of ethane.

According to embodiments, the pre-treating method includes subjecting the stream of make-up gas containing heavy hydrocarbons to a low temperature adiabatic reforming, in order to obtain a pre-reformed gas that can be used as a reducing agent for producing direct reduced iron.

It is noted here that the expression "low temperature" adiabatic reforming or reformer within all the embodiments described herein can be an adiabatic reforming or reformer performed at a temperature of between 300° C. to 600° C., in particular between 350° C. to 550° C. Possible examples of low temperature values of the adiabatic reforming can be e.g. 300° C., 350° C., 400° C., 450°, 500° C., 550°, 600° C. or any other possible intermediate temperature value.

According to further embodiments, described for example using FIGS. 1 to 5, the pre-treating apparatus includes a low temperature adiabatic reforming section 300 configured for subjecting the stream of make-up gas containing heavy hydrocarbons to a low temperature adiabatic reforming, in order to obtain a pre-reformed gas that can be used as a reducing agent for producing direct reduced iron in a direct reduced iron equipment 400.

Low temperature adiabatic reforming can be used to convert higher hydrocarbons present in the make-up gas into syngas and methane, while methane does not react to form syngas, due to the low temperature.

According to the present disclosure, a pre-reformed gas, with negligible amount of heavy hydrocarbons, can thus be advantageously fed to a DRI reactor 10 of the direct reduction equipment 400, with the favorable technical effect of eliminating the formation of carbon deposits in the heater tubes or avoiding the catalyst carburization or the increasing of the catalyst bed pressure drop in case of in-line stoichiometric reformer.

It is noted that an adiabatic pre-reforming process within the embodiments described herein can be based on several reactions:
1. the steam reforming of higher hydrocarbons is irreversible on a reforming catalyst, leading to a mixture of CO and $H_2$. The reaction is endothermic for every hydrocarbon species.

(e.g.: $\Delta H_{298}$=651 kJ/mol for $C_4H_{10}$)
2. the water gas shift reaction is at equilibrium under typical pre-reformer conditions, transforming CO into $H_2$. The reaction is slightly exothermic at the pre-reformer temperature and composition.

3. the methanation reaction, i.e. the inverse of the methane reforming reaction, is favored at the pre-reformer temperature and is intensely exothermic. $CO+3H_2=CH_4+H_2O$ $\Delta H_{298}$=−206 kJ/mol Reactions 2 and 3 approach thermodynamic equilibrium at the pre-reformer exit.

Thanks to the methanation reaction, temperature profile inside the pre-reformer is almost isothermal or slightly decreasing from the inlet (e.g. approximately 500° C.) to the outlet of the adiabatic bed, which is beneficial if the pre-reformed gas is to be used without cooling down. The pre-heating of the feed might occur by means of some fluid of the process, e.g. the pre-reformer products themselves or exploiting the residual heat of the fumes in the PGH, or in the convective section of the in-line stoichiometric reformer, etc. Differently from other technologies for removing heavy hydrocarbons, the pre-reforming becomes more convenient because these higher hydrocarbons are not only retained in the process gas feed, but they also give a consistent amount of syngas, useful during start-up and in normal operation, and further methane addition to the direct reduction equipment.

The steam to dry gas can operate as low as 0.4 mol/mol depending on the natural gas composition. The low amount of steam to be used in the pre-reformer, roughly proportional to the concentration of higher hydrocarbons in the raw natural gas, allows to keep the product hot and to send it to the reducing gas circuit without cooling down for condensation. In alternative, a small amount can be spilled and cooled to control the relative humidity of the process gas. As alternative embodiment, the reformed gas can be cooled to a certain temperature in order to reach the desired humidity, also exchanging heat with another stream in the process. In all the embodiments described herein, with respect to the conventional zero-reforming reducing gas circuit, the process schemes with the low temperature adiabatic reformer have the advantage that the humidifier can be avoided, if not deemed necessary.

In case the pre-reformer catalyst requires less amount of water with respect to the water required from the reducing reactor or from the in-line stoichiometric reformer, the extra water can be added in different ways. As an example, extra water can be added through the existing facilities used in the reducing circuits without pre-reformer, for instance mainly through recycle gas scrubbing, in the humidifier or in the top gas scrubber for in-line stoichiometric reformer circuit.

Normally, there is a recommended minimum hydrogen concentration in the feedstock, but this is usually determined by the purification section upstream. The required $H_2$ to run the desulphurizer may come from the reduction circuit or can be taken from the pre-reformed gas bed outlet. A desulphurizer can be necessary depending on the type of catalyst loaded in the pre-reformer. After desulphurizer, there might be a pre-heating. A single or multiple bed in parallel can be adopted depending on the raw natural gas composition and on the scheduling of maintenance provided.

Figure 2:
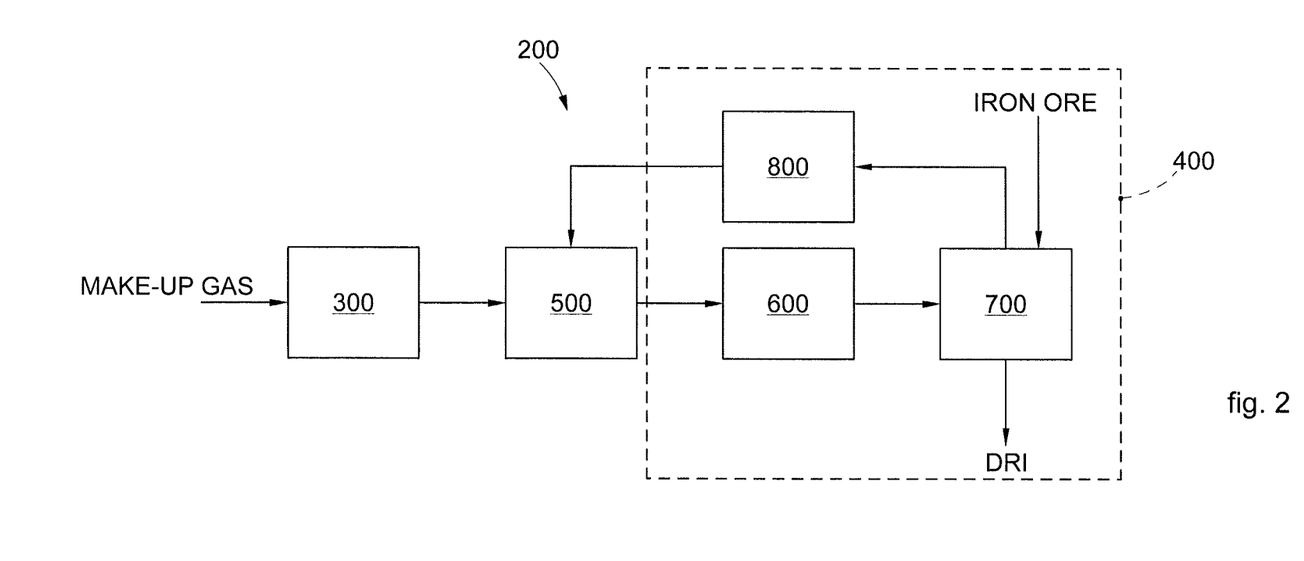
FIG. 2 is a schematic representation of an apparatus for producing direct reduced iron using a stream of make-up gas according to further embodiments described herein.
Figure 3:
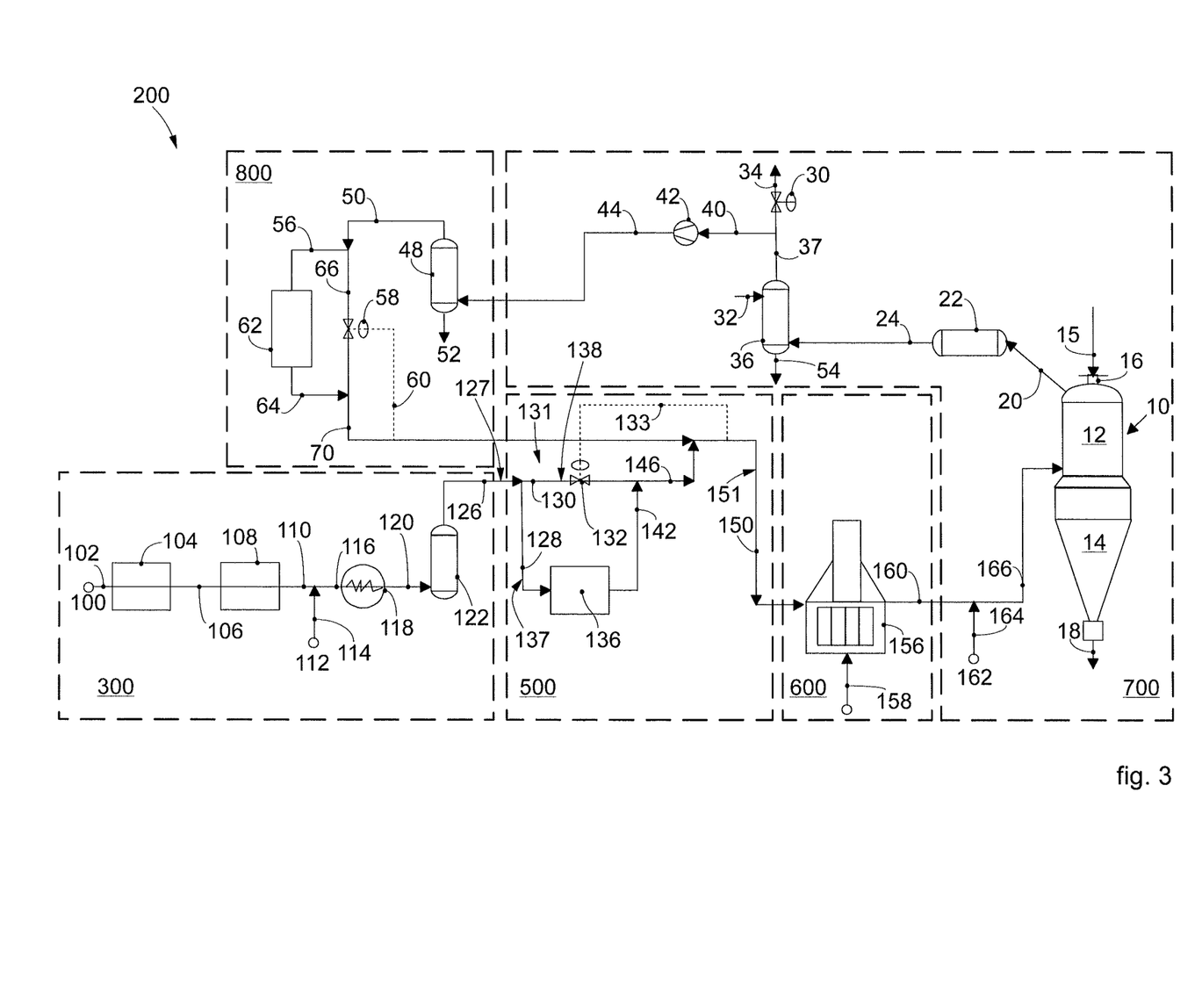
FIG. 3 is a schematic representation of an apparatus for producing direct reduced iron using a stream of make-up gas according to yet further embodiments described herein.

FIGS. 2 and 3 are used to describe embodiments according to the present disclosure, in which hydrogen and carbon monoxide are obtained from the pre-treated make-up gas by catalytic reformation of the pre-treated make-up gas "in situ" within the iron reduction system, in other words in the same reducing reactor where iron ore conversion to DRI is achieved. Embodiments described using FIGS. 2 and 3 can therefore be defined as zero-reformer process scheme, i.e. a process in which the reducing gas circuit contains no other catalytic stage besides the reducing reactor itself, so that the methane catalytic reforming occurs inside the reduction reactor. Reference will be made for instance to natural gas, but the same description can be applied to make-up gas as defined above.

According to embodiments described using FIGS. 2-3, the apparatus 200 includes the low temperature adiabatic reforming section 300 and the direct reduced iron equipment 400. According to embodiments, the direct reduced iron equipment 400 can be configured for carrying-out a zero-reformer process in which catalytic reformation of the pre-treated make-up gas is carried-out "in situ" within the direct reduced iron reactor 10 such that the pre-treated make-up gas is subjected to no further catalytic reaction besides the catalytic reactions that occur inside said direct reduced iron reactor 10. The direct reduced iron equipment 400 includes a DRI reaction section 700, including said direct reduced iron reactor 10. According to embodiments described using FIGS. 2 and 3, the DRI reaction section 700 can be configured for performing "in-situ" catalytic reformation of the make-up gas, according to the zero-reformer process scheme.

In possible implementations, the direct reduced iron equipment 400 may also include a gas heating section 600, for heating make-up gas prior to supplying it to the DRI reaction section 700.

In possible implementations, the direct reduced iron equipment 400 may also include a carbon dioxide removal and possible humidity content adjustment section 800, for removing carbon dioxide from the off reducing gas exiting the DRI reaction section 700 and possible adjustment of the humidity content thereof.

In possible implementations, the apparatus 200 may further include a humidity adjustment unit 500 configured for adjusting the humidity content of the make-up gas, after it has undergone pre-treatment in the low temperature adiabatic reforming section 300 and prior to using it in the direct reduced iron equipment 400.

Figure 1:
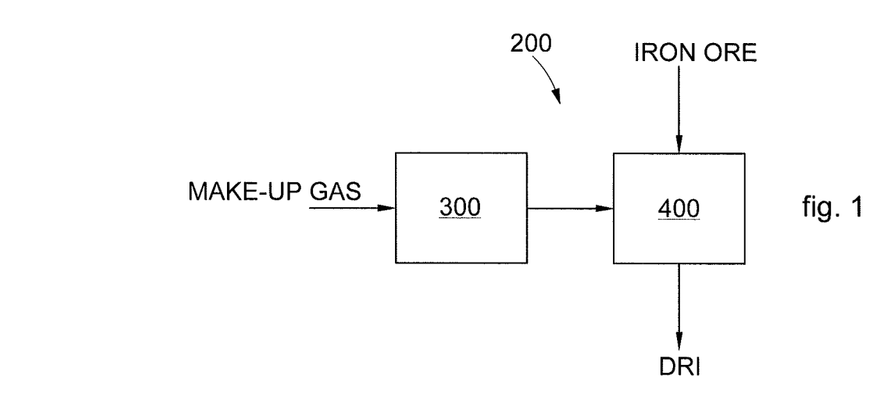
FIG. 1 is a schematic representation of an apparatus for producing direct reduced iron using a stream of make-up gas according to embodiments described herein.

FIG. 3 is used to describe embodiments, combinable with embodiments described using FIGS. 1 and 2, in which a preconditioned make-up gas is sent to a zero-reformer direct reduction plant, with or without condensing its water content, where it mixes with the recycled process gas that passed partly or totally through an humidifier.

According to embodiments described using FIG. 3, the low temperature adiabatic reforming section 300 may include a preheater 104, i.e. a Process Gas Heater (PGH).

Moreover, the low temperature adiabatic reforming section 300 may include a desulphurizer 108.

Furthermore, the low temperature adiabatic reforming section 300 may include a second preheater 118.

Again, the low temperature adiabatic reforming section 300 may include a low temperature adiabatic reforming reactor 122.

According to embodiments described using FIG. 3, raw natural gas from a source 100, at ambient temperature and pressure in the range from 10 to 20 bar g (bar gauge), is sent through pipe 102 to the preheater 104 and the preheated natural gas stream goes through pipe 106 to the desulphurizing unit 108. The preheater 104 and the desulphurizer 108 are optional and their possible usage depends on the downstream reforming catalyst. The desulphurized natural gas 110 is mixed with steam 114 from a source 112. The steam 114 may be pre-heated. The resulting gas stream 116 obtained by mixing the desulphurized natural gas 110 and steam 114 enters the second preheater 118, from which the gas exits at a temperature between 350° C. and 550° C., depending on the type of catalyst charged in the low temperature adiabatic reforming reactor 122. If a desulphurizer is present, the pre-reformer feedstock may or may not require a preheating before entering the low temperature adiabatic reforming reactor 122. The desulphurized and preheated feedstock 120 is sent to the low temperature adiabatic reforming reactor 122, where the higher hydrocarbons are converted into syngas and methane, while methane does not react to form syngas, due to the low temperature, to produce pre-reformer products 126. The low temperature adiabatic reforming reactor 122 may have one or more catalytic beds.

According to possible implementations, the pre-reformer products 126 may be used for pre-heating the natural gas stream in the above mentioned preheater 104.

FIG. 3 is further used to describe embodiments, combinable with embodiments described using FIGS. 1 and 2, in which the humidity adjustment unit 500 may include a bypass 131, possibly a valve 132, e.g. a three-ways valve, and a water separation unit 136.

The low temperature adiabatic reforming section 300 is connected to the humidity adjustment unit 500 via a connection pipe 127.

The pre-reformer products 126 flow through the connection pipe 127.

Moreover, the humidity adjustment unit 500 is connected to the direct reduced iron equipment 400 by means of a further connection pipe 151.

The bypass 131 is interposed between the connection pipe 127 and the further connection pipe 151.

The bypass 131 comprises a first branch 137 and a second branch 138, in which first ends of the first branch 137 and the second branch 138 are connected to the connection pipe 127, while the opposite ends are associated to the connection pipe 151.

The first branch 137 comprises the water separation unit 136.

The water separation unit 136 may comprise a condenser.

The valve 132 controls the flow of pre-reformer products 126 through the first branch 137 and the second branch 138.

According to one embodiment, the valve 132 may be installed in the second branch 138. According to a variant, the valve 132 may be installed at one of the connection zones of the first branch 137 and the second branch 138, to selectively splits the flow through the latters.

The pre-reformer products 126 are split by bypass 131 into a first part 128 of stream directed to the water separation unit 136 and a second part 130 of stream directed to the connection pipe 151, eventually passing through the valve 132.

In order to reduce the amount of the exceeding humidity from the pre-reformer products 126, the first part 128 of the reformer products 126 is subjected to a water separation, for example by cooling the first part 128 and condensate the latter to remove the exceeding humidity.

Then the first part 128 is mixed with the second part 130 to obtain a reducing stream 146, which is sent to the direct reduced iron equipment 400, through the connection pipe 151.

The particular configuration of the humidity adjustment unit 500 allows to remove the exceedance of humidity from the pre-reformer products 126 after the pre-treatment in the low temperature adiabatic reforming section 300, and at the same time substantially maintain the temperature of the pre-reformer products 126 exiting from the pre-treatment low temperature adiabatic reforming section 300.

In particular, thanks to the bypass 131 it is possible to adjust the humidity of the pre-reformer products 126 to a predefined value.

By made to pass only the necessary quantity of pre-reformer products 126 through the water separation unit 136, it is possible to remove the predefined quantity of water only on the first part 128 without altering the temperature of the second part 130.

This allows to increase the efficiency of the direct reduced iron equipment 400, by providing a reducing stream 146 with an high temperature and a predefined humidity.

The water separation unit 136 can be regulated to obtain the required amount of residual humidity in an exiting treated/pre-conditioned natural gas 142, in order to keep the required humidity in a reducing stream 150 which can be sent to the direct reduced iron equipment 400, in particular to the possible gas heater 600 and the subsequent DRI reaction section 700. The water separation unit 136 can include a heat exchanger with another fluid from the process or a quench tower or any other technique that is suitable for water separation in association with embodiments described herein. The extent of bypass that flows through pipe 130 is regulated though a valve 132 that controls the level of humidity of the process gas flowing through the connection pipe 151 by means of a signal 133.

The treated natural gas can be fed to the direct reduced iron equipment 400 where it is mixed with the recycled and regenerated gas 70 to obtain the reducing stream 150 for example with a content of water in the range from about 4% to about 10% volume by controlling the amount of bypass 130.

The recycled and regenerated gas 70 is provided by the humidity content adjustment section 800, which is connected to the connection pipe 151.

In this way the recycled and regenerated gas 70 is mixed with the reducing stream 150 after the water separation of the pre-reformer products 126. In this way, the properties of the recycled and regenerated gas 70 and the reducing stream 150 may be controlled independently to each other to increase the accuracy of at least temperatures and humidities.

The water content of the recycled gas 70 can be controlled by passing or not through an humidifier 62 of the carbon dioxide removal and possible humidity content adjustment section 800 as described below in more detail, totally or partly, and a bypass 66 is regulated through the valve 58, e.g. a three-ways valve, by means of a signal 60. The injection of the preconditioned natural gas 142 in the reducing circuit of the direct reduced iron equipment 400 can be done before or after some optional preheating of recycled process gas 70 and their mixture may constitute the process gas 150 to be sent to the reducing reactor 10.

FIG. 3 is further used to describe embodiments, combinable with embodiments described using FIGS. 1 and 2, in which the gas heating section 600 may include a gas heater 156. The process gas 150 exiting the humidity adjustment unit 500 can be sent to the process gas heater 156, where its temperature can be raised to a range from about 850° C. to about 1000° C. Thanks to the described method of gas pretreatment by low temperature adiabatic reforming, the reducing gas flowing inside the process gas heater 156 does not create deposits inside the heater tubes, leading to a safe and steady plant operation. Gas heater 156 is fired by combustion of a suitable fuel from a source 158 in a manner suitable for the purposes of the present disclosure. The hot reducing gas flows then through transfer line 160 towards the DRI reaction section 700.

FIG. 3 is further used to describe embodiments, combinable with embodiments described using FIGS. 1 and 2, in which the DRI reaction section 700 may include a DRI reactor 10. The DRI reactor 10 may include an upper reduction zone 12 receiving and converting the iron ore, and a lower discharge zone 14 for discharging the DRI produced.

The DRI reaction section 700 may also include a recuperative heat exchanger 22.

The DRI reaction section 700 may further include a water separation unit 36.

According to embodiments described using FIG. 3, the hot reducing gas flowing through transfer line 160 is mixed with an oxygen-containing gas from a source 162 and then enters upper reduction zone 12 of the DRI reactor 10. Since a major portion of the gas passing through the DRI reactor 10 is recycled back to the same DRI reactor 10, it may be preferred to use pure oxygen instead of air or oxygen-enriched air because the nitrogen of the air would accumulate in the recycled gas. The partial combustion of the reducing gas with oxygen raises its temperature to the range from about 950° C. to about 1150° C. Also, this partial combustion, besides providing energy for carrying out the endothermic carburization reactions of the DRI, produces hydrogen and carbon monoxide from the methane contained in the preconditioned natural gas fed to the reduction system. The reducing gas entering the DRI reactor 10 and also containing methane from the natural gas, reduces the iron oxides within the reactor and at the same time the oxidants contained in the reducing gas transform the methane to hydrogen and carbon monoxide taking advantage in the catalytic qualities of the DRI produced in the reduction reactor. In possible implementations, the reducing gas, at a temperature in the range from about 250° C. to about 550° C., may be withdrawn from DRI reactor 10 through a pipe 20 which can lead the off reducing gas to the above mentioned recuperative heat exchanger 22 and then, flowing through pipe 24, to the water separation unit 36. After cooling down and dewatering, the reducing gas flows through pipe 37 and it may be then divided into at least two portions. A minor portion may flow through pipe 34, possibly having a pressure control valve 30 through which some gas is purged from the system and for elimination of undesired accumulations of inert gases.

The major portion of the off reducing gas may flow through pipe 40 and may be moved by a pumping member 42, which can be a blower or a compressor, in order to recycle the gas to the DRI reactor 10.

FIG. 3 is further used to describe embodiments, combinable with embodiments described using FIGS. 1 and 2, in which the carbon dioxide removal and possible humidity content adjustment section 800 includes a carbon dioxide unit 48. Moreover, the carbon dioxide removal and possible humidity content adjustment section 800 may also include a humidifier 62. Further to this, the carbon dioxide removal and possible humidity content adjustment section 800 may include a bypass 66 and a valve 58.

After pumping member 42, the gas may flow through pipe 44 and then may be passed through the carbon dioxide unit 48 where carbon dioxide is separated from the other components of the reducing gas stream by suitable means as, for example, liquid absorber solutions (hot carbonate solutions, amines solutions or the like), PSA (pressure swing adsorption) units or preferably VPSA (vacuum pressure swing adsorption) units. Carbon dioxide is separated and flows through pipe 52 to be utilized in a variety of ways.

After being stripped of the carbon dioxide in the carbon dioxide unit 48, the recycled gas flows through pipe 50 thus completing the cycle.

According to embodiments described using FIG. 3, iron oxide ores 15 in lump or pelletized form, i.e. particulate solid iron ores, are fed into reactor 10 through the upper portion of the reduction zone 12, then are contacted and react with the hot reducing gas flowing counter-currently to the feed. In this way, solid material, flowing counter-currently with this gas, reacts with hydrogen and carbon monoxide producing direct reduced iron (DRI). The DRI, flowing through the lower discharge zone 14, is then finally discharged from said reactor 10 through the lower discharge zone 14, as DRI 18 with the desired amount of carbon and, depending on the type of subsequent utilization of the DRI, it may be hot or cold discharged.

Figure 4:
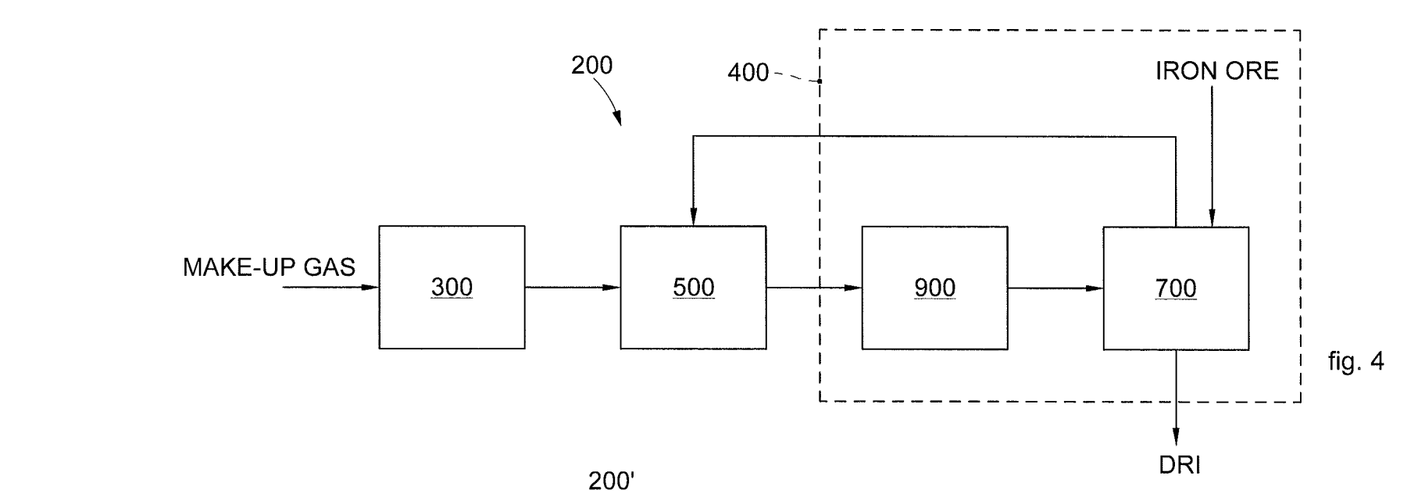
FIG. 4 is a schematic representation of an apparatus for producing direct reduced iron using a stream of make-up gas according to even further embodiments described herein.
Figure 5:
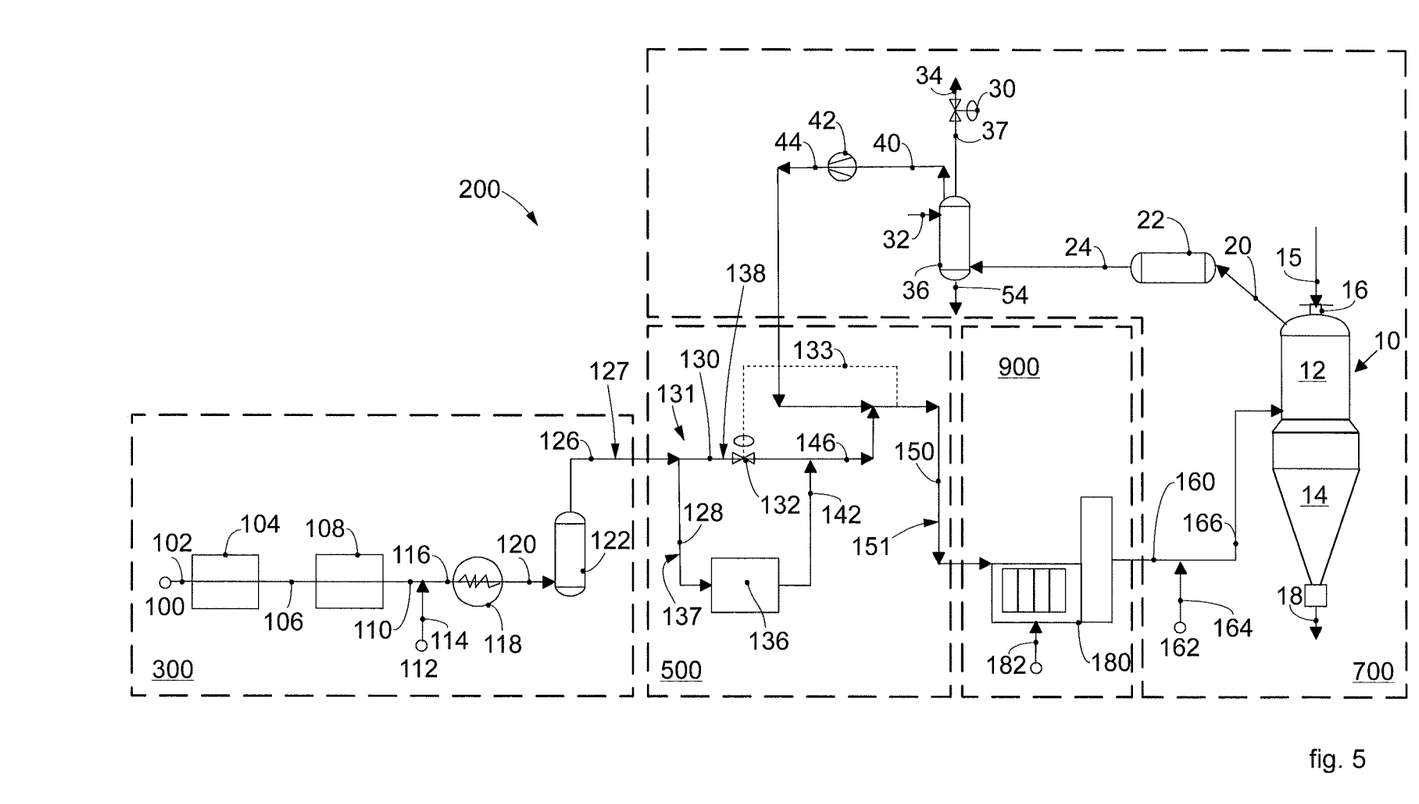
FIG. 5 is a schematic representation of an apparatus for producing direct reduced iron using a stream of make-up gas according to still further embodiments described herein.

FIGS. 4 and 5 are used to describe further embodiments according to the present disclosure, combinable with all embodiments described herein, in which hydrogen and carbon monoxide are obtained from the pre-treated make-up gas by reformation of the pre-treated make-up gas in an in-line stoichiometric reformer, in other words outside and upstream the reactor where iron ore conversion to DRI is achieved, differently from embodiments described using FIGS. 2 and 3, in which a zero-reforming process scheme is involved such that catalytic reformation of the pre-treated make-up gas is carried-out "in situ" within the direct reduced iron reactor 10. Also in this case, reference will be made for instance to natural gas, but the same description can be applied to make-up gas as defined above.

According to embodiments described using FIG. 4, the apparatus 200 includes the low temperature adiabatic reforming section 300 and the direct reduced iron equipment 400. The direct reduced iron equipment 400 includes the DRI reaction section 700. In possible implementations, the direct reduced iron equipment 400 also includes an in-line stoichiometric reforming section 900.

In possible implementations, the apparatus 200 described using FIGS. 4 and 5 may further include the humidity adjustment unit 500 configured for adjusting the humidity content of the make-up gas, after is has undergone pre-treatment in the low temperature adiabatic reforming section 300 and prior to using it in the direct reduced iron equipment 400.

The in-line stoichiometric reforming section 900 may be disposed between the humidity adjustment unit 500 and the DRI reaction section 700.

In embodiments described using FIGS. 4 and 5, the low temperature adiabatic reforming section 300, the humidity adjustment unit 500 and the DRI reaction section 700 may be configured according to embodiments described using FIGS. 2 and 3.

FIG. 5 is used to describe embodiments, combinable with embodiments described using FIGS. 1 and 4, in which the preconditioned make-up gas is sent to the direct reduction plant with in-line stoichiometric reformer, with or without condensing its water content, where it mixes with the recycled process gas.

According to embodiments described using FIG. 5, the in-line stoichiometric reforming section 900 may include an in-line stoichiometric reformer 180.

In embodiments described using FIG. 5, the process gas 150 is obtained as in embodiments described using FIGS. 2 and 3, by mixing the recycled process gas 44 and the preconditioned natural gas 142, as above described. The water content of the recycled gas 44 can be controlled by controlling the amount of water 32 sent to the water separation unit 36. The injection of the preconditioned natural gas 142 in the reducing circuit can be done before or after some optional preheating of the recycled process gas 44 and the mixture of them constitutes the process gas 150 to be sent to in-line stoichiometric reformer 180, where the methane is reformed to form syngas and exits at a temperature comprised between 800° C. and 950° C. The in-line stoichiometric reformer 180 is fired by combustion of a suitable fuel from a source 182 in a manner known in the art. The hot reducing gas flows then through transfer line 160 and is optionally mixed with an oxygen-containing gas from a source 162 to raise its temperature in the range from about 900° C. to 1100° C. The reducing gas entering the reactor and also containing methane from the natural gas, reduces the iron oxides within the reactor and at the same time the oxidants contained in the reducing gas transform the methane to hydrogen and carbon monoxide taking advantage in the catalytic qualities of the DRI produced in the reduction reactor. In possible implementations, the reducing gas, at a temperature in the range from about 250° C. to about 550° C., may be withdrawn from DRI reactor 10 through a pipe 20 which can lead it optionally to the above mentioned recuperative heat exchanger 22 and then, flowing through pipe 24, to the water separation unit 36. After cooling down and dewatering, two streams of reducing gas at different humidity content may be created, flowing through pipes 37 and 40. A minor portion may flow through pipe 34, possibly having a pressure control valve 30 through which some gases are purged from the reducing circuit for elimination of undesired accumulations of inert and oxidized gases. The major portion of the off reducing gas may flow through pipe 40 and may be moved by the pumping member 42, which can be a blower or a compressor, in order to recycle the gas to DRI reactor 10. After pumping member 42, the gas may flow through pipe 44 thus completing the cycle. According to embodiments described using FIG. 5, iron oxide ores 15 in lump or pelletized form, i.e. particulate solid iron ores, are fed into reactor 10 through the upper portion of the reduction zone 12, then are contacted and react with the hot reducing gas flowing counter-currently to the feed. In this way, solid material, flowing counter-currently with this gas, reacts with hydrogen and carbon monoxide producing direct reduced iron (DRI). The DRI, flowing through the lower discharge zone 14, is then finally discharged from said reactor 10 through the lower discharge zone 14, as DRI 18 with the desired amount of carbon and, depending on the type of subsequent utilization of the DRI, it may be hot or cold discharged.

Figure 6:
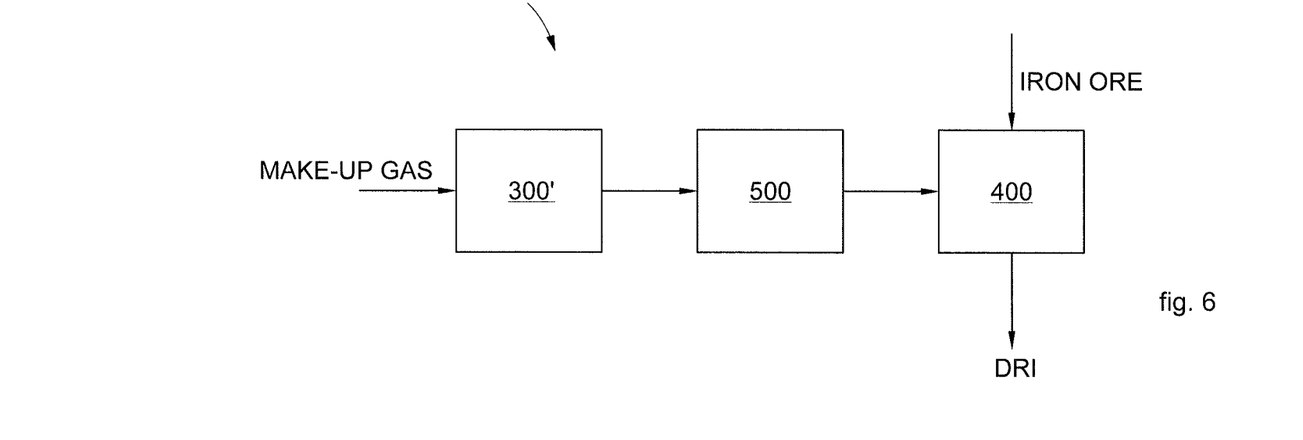
FIG. 6 is a schematic representation of an apparatus for humidity content adjustment of a stream of make-up gas used as a reduction agent in the production direct reduced iron using, according to embodiments described herein.

FIG. 6 is used to describe further embodiments according to the present disclosure, relating to a method for humidity content adjustment of a make-up gas to be used as a reducing agent for producing direct reduced iron. According to aspects, a make-up gas as defined above can be subjected to a pre-treatment or a catalytic conversion/transformation process, in the presence of steam/water, prior to using it as a reducing agent for producing direct reduced iron. According to embodiments, downstream of the pre-treatment or catalytic conversion/transformation process in the presence of steam/water and upstream of the production of direct reduced iron, the make-up gas can be subjected to humidity content adjustment by by-passing said stream to split it, according to needs, into a first part 128 of the stream of make-up gas that can be subjected to a water separation operation and then sending the first part 128 of make-up gas, with lowered content of humidity, to the production of direct reduced iron and a second part 130 of the stream of make-up gas. The second part 130 can be sent to the production of direct reduced iron, or can be mixed with the first part 128, having a reduced humidity content and then sent to the production of direct reduced iron. In this way it is possible to adjust the humidity content of the gas that is sent to the production of direct reduced iron according to requirements and for example depending on the nature and composition of the make-up gas that is used and/or depending on the specific kind of pre-treatment or catalytic conversion/transformation process that is performed.

According to embodiments described using FIG. 6, an apparatus 200' can be provided for humidity content adjustment of a stream of make-up gas prior to production of direct reduced iron. The apparatus 200' includes a humidity adjustment unit 500, as described for instance with reference to FIGS. 2, 3, 4 and 5. Upstream the humidity adjustment unit 500, a make-up gas pre-treating and/or catalytic conversion/transformation section 300' in the presence of steam and/or water is provided, receiving the make-up gas as above described for subjecting it to a pre-treatment and/or catalytic conversion/transformation. Downstream the humidity adjustment unit 500, the apparatus 200 or 200' may include a direct reduced iron equipment 400, receiving the make-up gas with adjusted humidity content from the humidity adjustment unit 500.

Besides the low temperature adiabatic reforming described using FIGS. 1 to 5, further examples of a pre-treating and/or catalytic conversion/transformation section 300' in the presence of steam and/or water that can be used in association with embodiments described using FIG. 6 can be catalytic partial oxidation with steam addition to the feed or autothermal reforming.

In embodiments of the apparatus 200' or 200, the bypass 131 of the humidity adjustment unit 500 can be used for by-passing the stream of make-up gas exiting the pre-treating and/or catalytic conversion/transformation section 300' or the low temperature adiabatic reforming section 300 to split it into a first part 128 and a second part 130. The valve 132 can be used to control the bypass, and thus the flowing of the second part 130, according to needs, e.g. according to the desired humidity content to be achieved.

Moreover, according to needs, for example in relation to the humidity content that is set as a target to be reached, the first part 128 of the stream of make-up gas received from the pre-treating and/or catalytic conversion/transformation section 300' or the low temperature adiabatic reforming section 300 can selectively be sent to the water separation unit 36 for subjecting it to a water separation operation and then sent the make-up gas, with lowered content of humidity, directly to the direct reduced iron equipment 400, for example in case the valve 132 is closed or mixing it with the second part 130 of the bypass stream and then using the reducing gas 150 obtained in the direct reduced iron equipment 400. The amount of the second part 130 flowing through the valve 132 can be adjusted not only according to a full open/closed regulation but also according to selected partial aperture of the valve 132, so as to attain all the range of variable adjustment flow conditions.

Embodiments of a method and apparatus for humidity content adjustment of a make-up gas to be used as a reducing agent for producing direct reduced iron described using FIG. 6 can be combined with embodiments described for instance using FIGS. 2 and 3, in the case of a zero-reforming process scheme, or with embodiments described for instance using FIGS. 4 and 5, in the case of an in-line stoichiometric reformer.

Various aspects and advantages and of the embodiments described herein can be summarized as follows.

The methods and apparatuses described according to the present disclosure can be used for direct reduction of iron ore with catalytic conversion of the hydrocarbons with exception of methane, for instance in a low temperature adiabatic reformer, operating the control of humidity in the process gas. Favourable technical effects related to embodiments described herein effects can be:

eliminating the carbon deposits inside the radiant tubes of the Process Gas Heater (e.g. gas heater 156), in a zero-reformer process scheme (see e.g. FIGS. 2 and 3);

reducing the carbon deposition in the reformer catalyst of a reduction circuit with in-line stoichiometric reformer (e.g. in-line stoichiometric reformer 180), thus prolonging operative life of the catalyst (see e.g. FIGS. 4 and 5);

increasing the direct reduction circuit efficiency (zero-reformer reactor or in-line stoichiometric reformer) by means of introduction of already produced $H_2$ and CO.

Embodiments described herein also allow to implement a humidity control system in order to meet the water requirement of the reduction circuit with the water requirement of e.g. the low temperature adiabatic reformer.

The humidity control can be created by means of direct or indirect gas cooling (i.e. heat exchanger and/or quenching tower) if the humidity present in the pre-reformed gas contains more water than what required by the reduction circuit.

In the opposite, in case the reduction circuit requires more water than the low temperature adiabatic reformer, the extra water can be added either increasing the steam to carbon in the low temperature adiabatic reformer feed gas and/or increasing the humidity in the recycled reducing gas through gas quenching (in the humidifier of a zero-reformer circuit or in the exhaust gas scrubber in the circuit with the in-line stoichiometric reformer). In this case the humidification can be done to the whole recycled gas flow rate or to a limited amount.

Moreover, according to a further advantageous aspect, the process gas obtained through the mixing of pre-reformed and the recycled gas can be sent to a process gas heater (see e.g. FIG. 3) or to an in-line stoichiometric reformer (see e.g. FIG. 5). Again, advantageously the pre-reformed gas can be injected in whatever point of the reduction circuit of the direct reduced iron equipment.

In addition, a favorable aspect is that the $H_2$-rich stream to be fed to the de-sulphurizing system might come from the recycled gas of the reducing circuit or from the pre-reformed stream itself.

A further advantageous aspect is that preheating of the feed to the low temperature adiabatic reformer can be achieved by means of the Process Gas Heater (PGH) or with the residual sensible heat of the in-line stoichiometric reformer fumes or through a dedicated heat exchanger or furnace.

While the foregoing is directed to embodiments of the invention, other and further embodiments of the invention may be devised without departing from the basic scope thereof, and the scope thereof is determined by the claims that follow. In the following claims, the sole purpose of the references in brackets is to facilitate reading: they shall not considered as limiting factors with regard to the field of protection claimed in the specific claims.

The invention claimed is:

1. A method for producing direct reduced iron, said method comprising:
    pre-treating a stream of make-up gas containing heavy hydrocarbons by subjecting the stream of make-up gas to a low temperature adiabatic reforming at a temperature comprised between 300° C. and 600° C. to form a stream of pre-treated make-up gas to be used as a reducing agent for producing direct reduced iron;
    subjecting said stream of pre-treated make-up gas to adjust humidity content of said stream of pre-treated make-up gas after said low temperature adiabatic reforming by bypassing said stream of pre-treated make-up gas to selectively split said stream of pre-treated make-up gas into a first part (128) of said stream of pre-treated make-up gas and a second part (130) of said stream of pre-treated make-up gas and subjecting only said first part (128) to a water separation in a water separation unit (136) and then mixing said first part (128) to said second part (130) to obtain a reducing stream (146);
    sending said reducing stream (146) to a direct reduced iron reactor (10) and carrying out a zero-reformer process in which catalytic reformation of the pre-treated make-up gas is carried-out in situ within the direct reduced iron reactor (10) to produce direct reduced iron, wherein the pre-treated make-up gas is not subjected to any further catalytic reaction besides the catalytic reactions that occur inside said direct reduced iron reactor (10).

2. The method of claim 1, wherein said method comprises pre-heating the make-up gas prior to the low temperature adiabatic reforming.

3. The method of claim 2, wherein said method comprises de-sulphurizing said make-up gas after pre-heating and prior to the low temperature adiabatic reforming.

4. The method of claim 3, wherein said method comprises injecting steam into the stream of make-up gas after de-sulphurizing and prior to the low temperature adiabatic reforming.

5. The method of claim 4, wherein said method comprises heating the stream of make-up gas after steam injection and prior to the low temperature adiabatic reforming.

6. The method of claim 1, said method comprising subjecting off reducing gas from the direct reduced iron reactor (10) to at least water separation.

7. The method of claim 6, said method comprising mixing the off reducing gas, after the at least water separation, with said stream of pre-treated make-up gas.

8. The method of claim 6, said method comprising mixing the off reducing gas, after the at least water separation, with the stream of pre-treated make-up gas subjected to adjust humidity content after the low temperature adiabatic reforming.

9. The method of claim 6, said method comprising subjecting the off reducing gas, after the at least water separation, to carbon dioxide removal and possible humidity content adjustment.

10. The method of claim 9, said method comprising mixing the off reducing gas, after the carbon dioxide removal and possible humidity content adjustment, with said stream of pre-treated make-up gas.

11. The method of claim 9, said method comprising mixing the off reducing gas, after the carbon dioxide removal and possible humidity content adjustment, with a stream of pre-treated make-up gas that has been subjected to adjust humidity content after the low temperature adiabatic reforming.

12. An apparatus for producing direct reduced iron, said apparatus comprising:
    a direct reduced iron equipment (400) comprising a direct reduced iron reactor (10);
    wherein said direct reduced iron equipment (400) is configured for carrying-out a zero-reformer process in which catalytic reformation of the pre-treated make-up gas is carried-out in situ within the direct reduced iron reactor (10) such that the pre-treated make-up gas is subjected to no further catalytic reaction besides the catalytic reactions that occur inside said direct reduced iron reactor (10),
    wherein said apparatus comprises a low temperature adiabatic reforming section (300) comprising a low temperature adiabatic reforming reactor (122) configured for subjecting a stream of make-up gas containing heavy hydrocarbons to a low temperature adiabatic reforming at a temperature comprised between 300° C. and 600° C., prior to using said stream of make-up gas as a reducing agent for producing direct reduced iron in said direct reduced iron equipment (400), in order to obtain a pre-reformed gas suitable for use as a reducing agent for producing direct reduced iron in said direct reduced iron equipment (400); and in that it comprises a humidity adjustment unit (500) configured for adjusting humidity content of said stream of make-up gas after the low temperature adiabatic reforming reactor (122), said humidity adjustment unit (500) comprising:
    a bypass (131) located downstream of the low temperature adiabatic reforming reactor (122) and provided with a first branch (137) and a second branch (138) to selectively split said stream of make-up gas into a first part (128) of said stream of make-up gas and a second part (130) of said stream of make-up gas;
    a water separation unit (136) associated to said first branch (137) and configured for subjecting said first part (128) to a water separation to be then mixed with said second part (130) to obtain a reducing stream (146) to be sent to said direct reduced iron equipment (400).

13. The apparatus of claim 12, wherein said low temperature adiabatic reforming section (300) comprises a gas pre-heater (104) upstream the low temperature adiabatic reforming reactor (122).

14. The apparatus of claim 13, wherein said low temperature adiabatic reforming section (300) comprises a de-sulphurizer (108) downstream of the gas pre-heater (104) and upstream of the low temperature adiabatic reforming reactor (122).

15. The apparatus of claim 14, wherein said low temperature adiabatic reforming section (300) comprises a steam source (112) for injecting steam (114) into the stream of make-up gas after the de-sulphurizer (108) and upstream of the low temperature adiabatic reforming reactor (122).

16. The apparatus of claim 15, wherein said low temperature adiabatic reforming section (300) comprises a heater (118) after the steam injection (114) and upstream of the low temperature adiabatic reforming reactor (122).

17. The apparatus of claim 12, said apparatus further comprising a water separation unit (36) for subjecting off reducing gas from the direct reduced iron reactor (10) to at least water separation.

18. The apparatus of claim 17, said apparatus further comprising a carbon dioxide removal and possible humidity content adjustment section (800), for removing carbon dioxide from the off reducing gas after the water separation unit (36).

19. The apparatus of claim 18, wherein said carbon dioxide removal and possible humidity content adjustment section (800) is connected to a connection pipe (151) provided to connect said humidity adjustment unit (500) to the direct reduced iron equipment (400).

* * * * *